May 9, 1939.  C. R. CRAVER  2,157,401

UNIVERSAL CONNECTION

Filed Dec. 28, 1936

Inventor
CLYDE R. CRAVER

By Jack A. Schley
Attorney

Patented May 9, 1939

2,157,401

UNITED STATES PATENT OFFICE 2,157,401

UNIVERSAL CONNECTION

Clyde R. Craver, Denison, Tex.

Application December 28, 1936, Serial No. 117,718

2 Claims. (Cl. 287—90)

This invention relates to new and useful improvements in universal connections.

One object of the invention is to provide an improved means for connecting two members so that said members may undergo universal movement with relation to each other; the connection being particularly adapted for use in the steering mechanism of a vehicle, although it may be used elsewhere.

An important object is to provide an improved universal connection which is so constructed that wear in the parts thereof may be compensated for, whereby the life of the connection is increased and excessive wear on the members associated with said connection is reduced.

A further object of the invention is to provide an improved universal connection including a ball member and socket, the ball member being constructed in two or more parts and held in operating position by an expanding member, whereby as wear on the ball occurs said expanding member may be adjusted to compensate for such wear.

Still another object of the invention is to provide an improved universal connection including a socket for receiving a ball member, the parts of the socket being adjustable with relation to each other, whereby the size of said socket may be varied to compensate for wear of the same.

A still further object of the invention is to provide an improved universal connection which is constructed of a minimum number of parts whereby it may be readily assembled or disassembled, and having means for lubricating the movable parts thereof, whereby wear thereon is reduced.

A construction designed to carry out the invention will be hereinafter described, together with other features of the invention.

Figure 1:
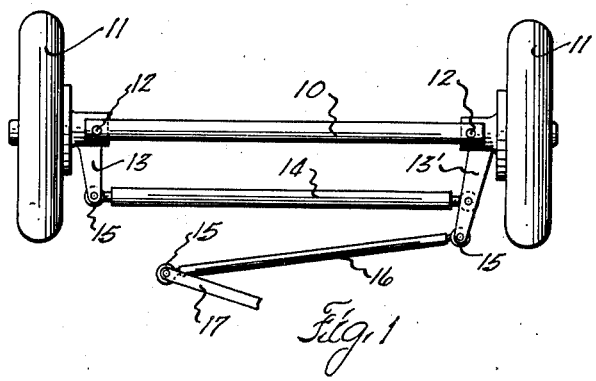
Figure 2:
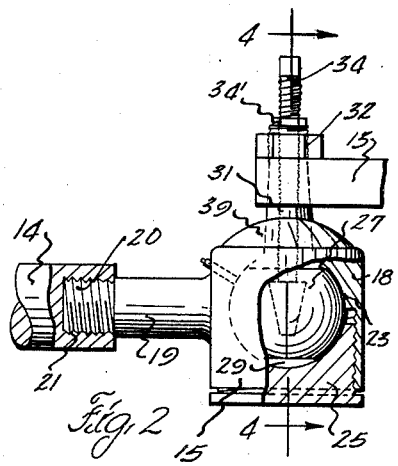
Figures 3, 4:
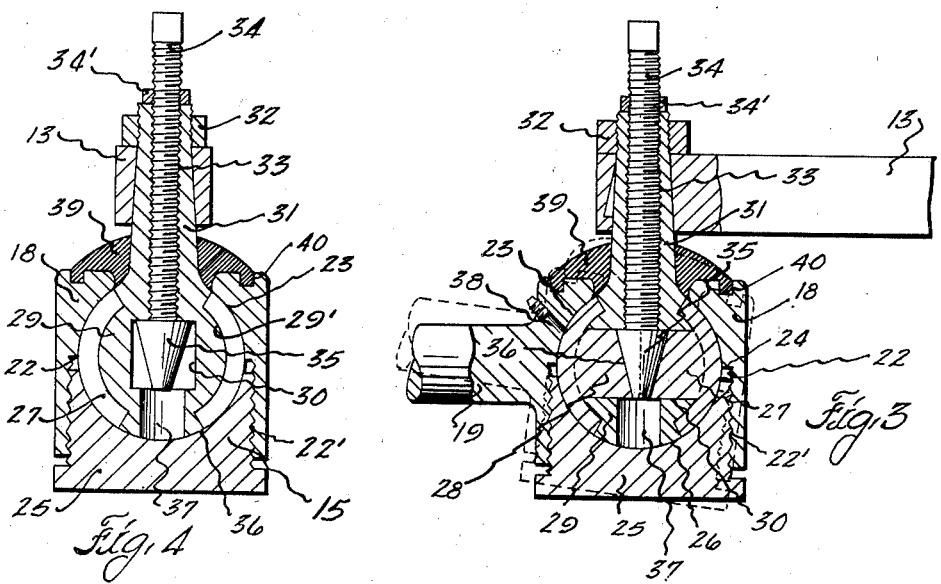
Figure 5:
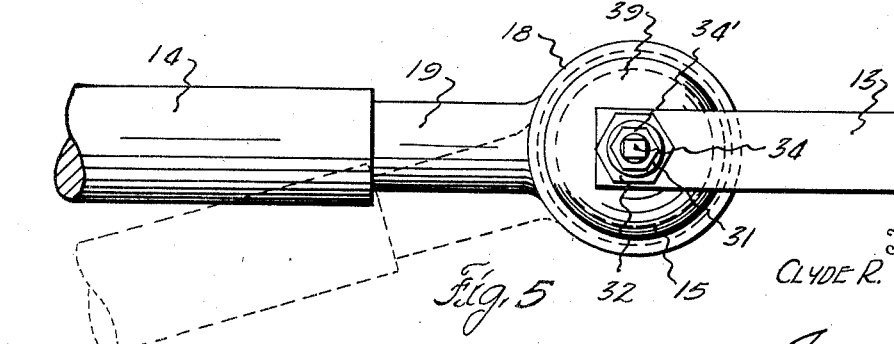

The invention will be more readily understood from a reading of the following specification and by reference to the accompanying drawing, in which an example of the invention is shown, and wherein:

Figure 1 is a diagrammatical view of the steering assembly of a vehicle, showing the universal connection constructed in accordance with the invention connected therein, Figure 2 is a view of the connection, partly in elevation and partly in section, Figure 3 is a transverse, vertical, sectional view of the same, Figure 4 is a similar view taken on the line 4—4 of Figure 2, and Figure 5 is a plan view.

In the drawing, the numeral 10 designates the front axle of a vehicle and the front wheels 11 of said vehicle are pivoted on pins 12 in the usual manner to the ends of said axle. Arms 13 and 13' extend rearwardly from each wheel and a transverse tie rod 14 connects these arms together. Each end of the rod 14 is secured to the arms by universal connections 15. The extreme outer end of the arm 13' is connected by means of a universal connection 15 to one end of a drag link 16. The opposite end of this link is secured by a similar universal connection 15 with one end of an operating pitman 17. When the pitman 17 is operated the arms 13 and 13' the swung, whereby the front wheels 11 are turned with relation to the axle 10. The invention does not reside in the particular steering assembly but only in the universal connections 15 which connect the various parts of said assembly. It is noted, therefore, that the invention is not to be limited to the particular steering assembly shown and neither is it to be limited to employing the universal connections for a steering assembly, as they could be used for other mechanisms.

The details of the universal connections 15 are clearly shown in Figures 2 to 5 and each connection includes a body or block 18 which is generally cylindrical in cross-section. A pin 19, preferably made integral with the body 18, extends radially therefrom and has its extreme outer end externally screwthreaded at 20. This screwthreaded end is screwed into a socket 21 which is provided in the end of one of the members to be connected, this member for the purposes of illustration being the tie rod 14.

The body or block 18 is provided with an axial bore 22 which has its lower end internally screwthreaded as shown at 22'. An arcuate or concave, annular seat 23 is formed at the upper end of the bore 22 and an internal annular shoulder 24 at the base of the seat. As clearly shown in Figure 3, the extreme upper end of the bore or that portion above the arcuate seat 23 is much less in diameter than the lower end of said bore. The lower end of the bore 22 of the body or block is closed by a plug or nut 25 which is screwthreaded into the same. The upper end of the plug is formed with a concave seat 26 which, when the plug is in position within the body, coacts with the arcuate or concave seat 23 to form a spherical socket within the body. The plug is formed with an external annular flange at its lower end.

A ball member is mounted to revolve in the socket which is formed within the body 18 and this member includes a pair of movable sections 27 which have a semi-spherical shape so as to conform to the contour of the wall of the socket. Each section 27 is provided with an inwardly extending block or lug 28 which is substantially rectangular in cross-section. The sections are carried by a spherical supporting element 29 which forms the core of the ball member. The supporting element is formed with a diametrically extending opening 30 which is substantially rectangular in cross-section and of the same size as the blocks 28 provided on the sections 27, whereby said blocks have a sliding fit within this opening. When the blocks 28 are located within the opening 30, as clearly shown in Figure 3, the inner surface of each section 27 fits within a recessed portion 29' provided in the outer surface of the supporting element 29, whereby the outer surface of the sections and the outer surface of the element 29 are flush to form a sphere.

The supporting element 29 is provided with an elongate tubular shank 31 which extends axially from the upper end of the housing 18. The outer end of the arm 13 is keyed onto the shank 31 being held in place thereon by a retaining nut 32 which is screwed onto the extreme upper end of said shank. The bore 33 of the shank is threaded throughout its length and an elongate adjusting screw 34 is screwed into said bore. The lower end of the screw 34 has a conical or tapered pin 35 thereon and this pin is preferably made integral with the screw. The pin is normally positioned within the diametrically extending opening 30 within the supporting element 29 and is arranged to engage tapered recesses or slots 36 which are formed in the inner ends of the blocks 28 of the sections 27. Each recess or slot 36 is substantially semi-circular in cross-section, whereby when the parts are in the position shown in Figure 3, the recesses form a conical opening which is located in the center of the supporting element 29. Obviously, the engagement of the tapered pin 35 within the recesses 36 formed in the inner ends of the blocks 28, serve to hold the section 27 outwardly so that their outer surfaces engage the wall of the socket. A vertical opening 37 is formed in the lower end of the supporting element 29 and is in alinement with the pin 35, whereby when the screw 34 is rotated to move the pin 35 downwardly, the lower end of said pin may enter this opening. The opening 37, of course, extends from the outer surface of the supporting element 29 inwardly to the diametrically extending opening 30, as is clearly shown in Figure 3. It is noted that the upper end of the conical pin 35 has a larger diameter than the bore 33 of the shank 31, whereby it is impossible to move the pin 35 upwardly through the bore of the shank. For lubricating the ball member and socket, an inclined port 38 is provided in the upper end of the body 18 and extends from the exterior of said body to the concave seat 23. This port is closed by a suitable fitting. To retain the lubricant within the socket without interfering with the movement of any of the parts thereof, a flexible circular cap 39, constructed of rubber or other suitable material, is mounted in an annular groove 40 formed in the top of the body. The cap surrounds the shank 31 and extends downwardly within the reduced upper end of the bore of the body and engages the supporting element 29.

The universal connection so formed, has been shown as connecting the arm 13 with the tie rod 14 but it is manifest that said connection can be employed in connecting any two members. In the operation of the device, it will be obvious that the ball member formed by the sections 27 and supporting elements 29 may revolve within the socket in the body 18. For efficient operation, it is desirable that said ball member have a snug fit within said socket. The ball member and socket will, of course, wear through usage and as this wear occurs a clearance will be noticeable between the outer surface of the ball member and the wall of the socket. This clearance is undesirable because it not only promotes further wear of both the ball member and the socket, but it also produces excessive wear on the parts or members associated with the connection. In order to take up this clearance, it is only necessary to rotate the screw 34 which will move the pin 35 downwardly in the recesses 36 at the inner end of the block 28. Due to the taper of the pin 35, it will be obvious that a downward movement of this pin will expand or move the section 27 outwardly into tight engagement with the wall of the socket. Thus, the clearance created by wear will be taken up and the ball member will again have a snug fit within its socket. For holding the elongate screw 34 in its adjusted position a jam nut 34' may be screwed on its upper end and this nut is adapted to engage the upper end of the shank to lock the screw 34 in its various positions.

In the event that the taper of the pin 35 is insufficient to expand the section 27 far enough to take up all of the clearance caused by excessive wear, then it is possible to tighten up the plug or nut 25 which closes the lower end of the body 18. A tightening of this nut would result in moving the nut further into the body 18 and, therefore, the semi-spherical seat 26 which forms a part of the socket will be moved closer to the ball member. Thus, a double adjustment is provided whereby even the most excessive wear on either the ball member or the socket can be taken care of. The compensation for wear results not only in increasing the life of the universal connection 15 but also in preventing excessive wear on the parts connected or associated with said connection 15. It is again noted that although the device has been shown and described as applied to the steering mechanism of a vehicle, it may be employed for connecting any two members, wherein universal movement of the members with relation to each other is desired.

What I claim and desire to secure by Letters Patent, is:

1. A universal connection including, a body having a spherical socket therein, a ball member mounted to revolve within said socket, said member comprising a spherical supporting element located within the socket, movable sections carried by the element and having their outer surfaces adapted to engage the wall of the socket, and expanding means within the element for moving the sections outwardly when wear between the ball member and socket occurs, whereby engagement of the sections with socket wall is maintained.

2. A universal connection including, a body having a spherical socket therein, a ball member mounted to revolve within said socket, said member comprising a spherical supporting element located within the socket and being of a smaller size than the socket, movable semi-spherical sections mounted on the surface of the supporting element and having their outer surfaces adapted to engage the wall of the socket, said supporting member having a diametrically extending opening extending therethrough, blocks on the movable sections engaging in said opening, and expanding means within the supporting element disposed between the blocks for engaging the same to move the sections outwardly when wear between the member and socket occurs.

CLYDE R. CRAVER.